(12) United States Patent
Jewell

(10) Patent No.: US 6,220,788 B1
(45) Date of Patent: Apr. 24, 2001

(54) PIPELINE WEIGHT

(75) Inventor: Glen Alvin Jewell, Athabasca (CA)

(73) Assignee: 762723 Alberta Ltd., Edmonton ( * ) Notice: Subject to any disclaimer, the term of this patent is extended or adjusted under 35 U.S.C. 154(b) by 0 days.

(21) Appl. No.: 09/362,458

(22) Filed: Jul. 28, 1999

(30) Foreign Application Priority Data

Jul. 16, 1999 (CA) .................................................. 2277523

(51) Int. Cl.$^7$ ........................................................ F16L 1/20
(52) U.S. Cl. ................................................................ 405/172
(58) Field of Search ................................... 405/172, 171, 405/159, 158, 157, 154

(56) References Cited

U.S. PATENT DOCUMENTS

| | | | |
|---|---|---|---|
| 2,518,981 | 8/1950 | Edwards | 138/25 |
| 2,791,019 | 5/1957 | DuLaney | 25/118 |
| 3,240,512 | 3/1966 | Pennington et al. | 285/45 |
| 3,640,073 | 2/1972 | Samsel | 405/70 |
| 3,779,027 | 12/1973 | Murphy | 405/172 |
| 3,793,845 | 2/1974 | Keith | 405/172 |
| 3,993,192 | * 11/1976 | Bunn | 206/515 |
| 4,102,137 | * 7/1978 | Porraz et al. | 405/172 |
| 4,166,710 | 9/1979 | Spiridonov | 405/172 |
| 4,338,044 | * 7/1982 | Titus | 405/172 |
| 4,477,206 | * 10/1984 | Papetti et al. | 405/172 |
| 4,606,378 | * 8/1986 | Meyer | 138/103 |
| 4,913,588 | 4/1990 | Vilnes | 405/157 |
| 5,385,430 | 1/1995 | Connors | 405/157 |
| 5,443,329 | 8/1995 | deGeeter | 495/172 |
| 5,603,588 | * 2/1997 | Herbert | 405/172 |

FOREIGN PATENT DOCUMENTS

| | | | |
|---|---|---|---|
| 7804-372 | * 10/1979 | (NL) | 405/172 |
| 773-370 | * 10/1980 | (SU) | 405/172 |
| 1687992 | * 10/1991 | (SU) | 405/172 |
| 79/00109 | * 3/1979 | (WO) | 405/172 |

\* cited by examiner

*Primary Examiner*—Eileen D. Lillis
*Assistant Examiner*—Frederick L. Lagman
(74) *Attorney, Agent, or Firm*—Christensen O'Connor Johnson Kindness PLLC

(57) ABSTRACT

A pipeline weight includes a first flexible pouch and a second flexible pouch with a connecting web extending between the first pouch and the second pouch. Each of the first pouch and the second pouch are filled with a weight enhancing filler material.

10 Claims, 2 Drawing Sheets

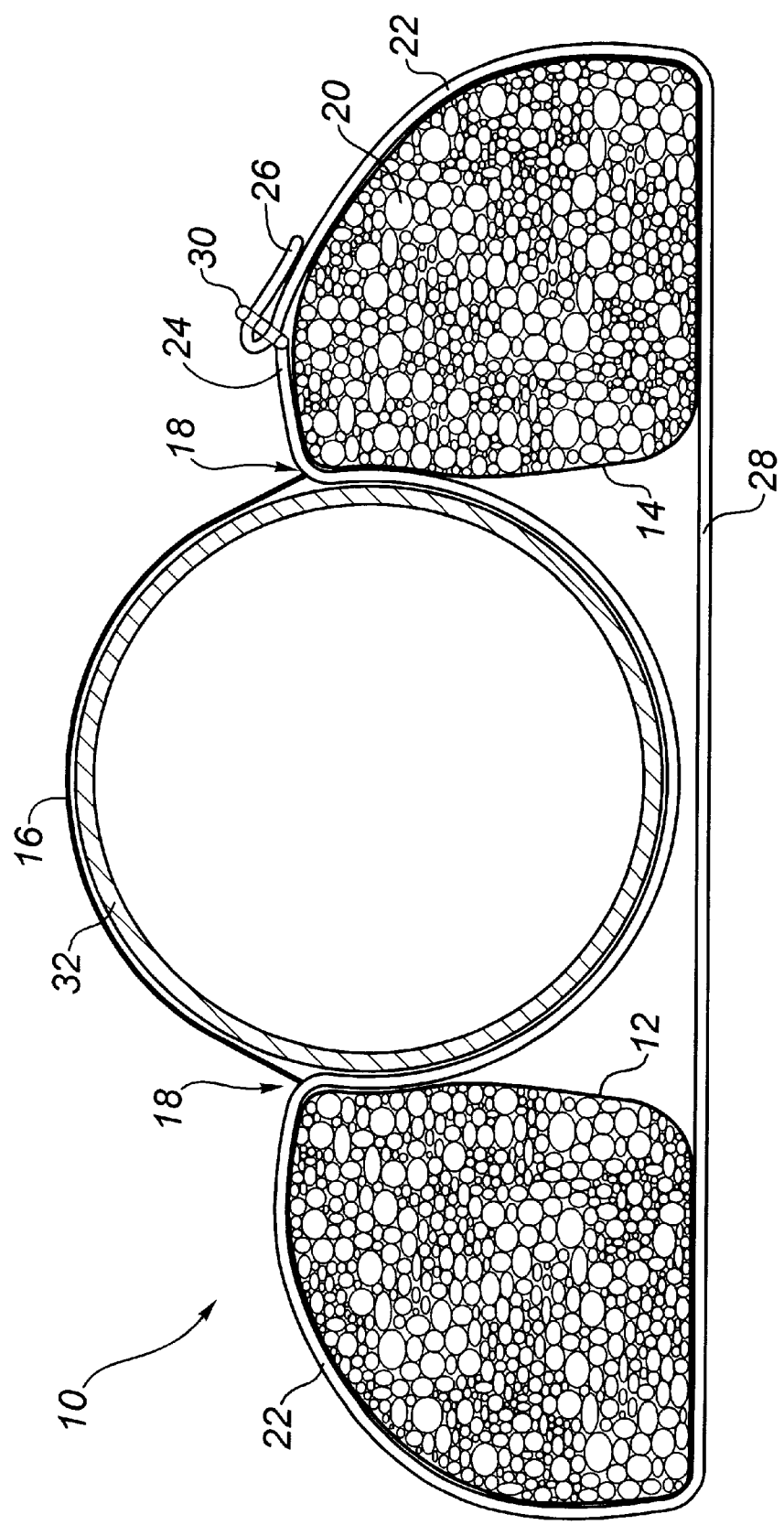

PIPELINE WEIGHT

FIELD OF THE INVENTION

The present invention relates to a pipeline weight.

BACKGROUND OF THE INVENTION

A pipeline is constructed out of numerous sections of pipe connected in end to end relation. Most pipelines are made from steel pipes. Each section of steel pipe used has a protective coating, usually of polymer plastic.

Pipeline weights are placed at selected positions along the pipeline. These pipeline weights are, typically, made from concrete. Although there are some alternative configurations, most pipeline weights are made from two semi-circular halves that are bolted together around the pipeline. Examples of pipeline weights are disclosed in U.S. Pat. Nos. 2,518,981; 2,791,019; 3,240,512; 4,166,710 and 5,443,329.

Care must be taken when installing pipeline weights not to damage the protective coating. Abrasion of the protective coating leads to corrosion and, eventually, to failure of the pipe.

SUMMARY OF THE INVENTION

What is required is a pipeline weight that will not be as likely to damage the protection coating of a pipeline during installation.

According to the present invention there is provided a pipeline weight which includes a first flexible pouch and a second flexible pouch with a connecting web extending between the first pouch and the second pouch. Each of the first pouch and the second pouch are filled with a weight enhancing filler material.

The pipeline weight, as described above, is less abrasive than concrete pipeline weights. It also has a number of other advantages over concrete pipeline weights. The pipeline weight described is considered to be safer to install, as an injury suffered by a workman struck by the pipeline weight is likely to be less severe than if the workman were struck with a concrete pipeline weight. The pipeline weight described is considered to be less expensive as low cost fill material can be used.

Although beneficial results may be obtained through the pipeline weight, as described above, the buoyancy of the pipeline weight in water is of concern. It is, therefore, preferable that the first pouch and the second pouch be water permeable. This enables water to pass through the pouches and air to escape.

It will be apparent to one skilled in the art that there are a variety of materials out of which the first pouch and the second pouch can be made. Beneficial results have been obtained through the use of a non-woven polypropylene.

It will be apparent to one skilled in the art that there are a variety of materials which can be used as weight enhancing filler material. Along most pipeline right of ways are rock fragments of varying size that can be recovered and used for negligible cost. Beneficial results have been obtained when gravel, sand or mixed gravel and sand is used.

The pipeline weight, as described above, can be positioned on a pipeline by placing the first pouch on one side of the pipeline and placing the second pouch on the other side of the pipeline, with the first pouch and the second pouch suspended from the pipeline by means of the connecting web. In installations where even more stability is required, beneficial results have been obtained when the connecting web has openings. Attachment straps can then be threaded through the openings to strap the pipeline weight onto the pipeline.

BRIEF DESCRIPTION OF THE DRAWINGS

These and other features of the invention will become more apparent from the following description in which reference is made to the appended drawings, wherein:

FIG. 2 is an end elevation view, in section, of the pipeline weight illustrated in FIG. 1, secured by straps to a pipeline.

DETAILED DESCRIPTION OF THE PREFERRED EMBODIMENT

Figure 1:
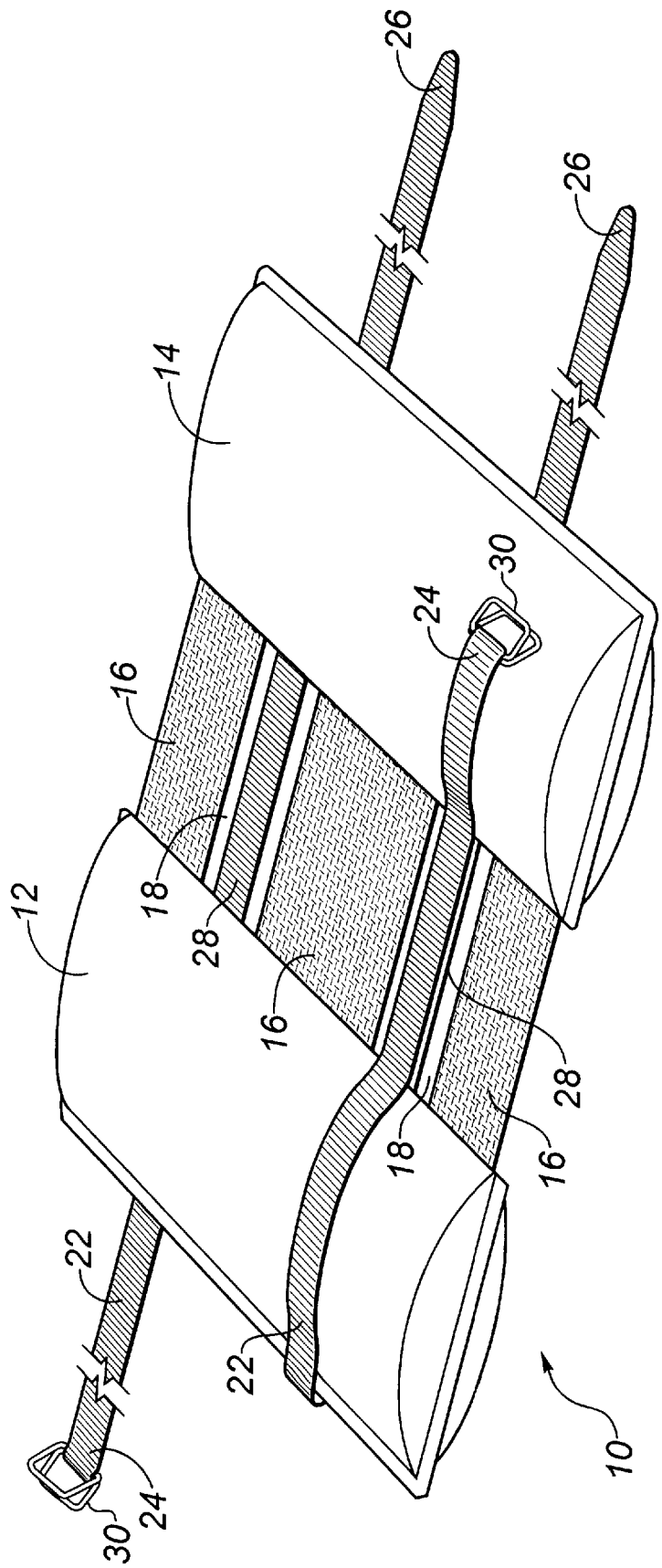
FIG. 1 is a perspective view of a pipeline weight constructed in accordance with the teachings of the present invention.

The preferred embodiment, a pipeline weight generally identified by reference numeral 10, will now be described with reference to FIGS. 1 and 2.

Referring to FIG. 1, pipeline weight 10 includes a first flexible water permeable non-woven polypropylene filter fabric pouch 12, a second flexible water permeable non-woven polypropylene filter fabric pouch 14, and a connecting web 16 extending between the first pouch and the second pouch. Connecting web 16 has openings 18. Referring to FIG. 2, both first pouch 12 and second pouch 14 are filled with a weight enhancing filler material 20. Filler material may be one or more of sand, gravel or crushed rock, or like material. Attachment straps 22 are threaded through openings 18. Each of attachment straps has a first end 24, a second end 26, and a central portion 28. A buckle 30 is positioned at first end 24 by means of which second end 26 is securable to first end 24.

The use of pipeline weight 10 will now be described with reference to FIGS. 1 and 2. Referring to FIG. 2, pipeline weight 10 is lain across a pipeline 32 such that connecting web 16 overlies pipeline 32 and first pouch 12 and second pouch 14 lie on opposed sides of pipeline 32. Each of attachment straps 22 is secured about first pouch 12, second pouch 14, and pipeline 32 as will now be described. Attachment strap 22 is passed under pipeline 32 until central portion 28 underlies pipeline 32. Second end 26 of attachment strap 22 is secured to first end 24 by means of buckle 30. It is preferred that attachment straps 22 are each secured tightly about first pouch 12, second pouch 14, and pipeline 22 so as to prevent pipeline weight 10 from being caused to slide along pipeline 32 in response to water current or impact by moving objects.

The pipeline weight, as described above, is less abrasive than concrete pipeline weights. It also has a number of other advantages over concrete pipeline weights. The pipeline weight described is considered to be safer to install, as an injury suffered by a workman struck by the pipeline weight is likely to be less severe than if the workman were struck with a concrete pipeline weight. The pipeline weight described is considered to be less expensive as low cost fill material can be used. Although pipeline weight 10 has been described as being made from a non-woven polypropylene, it will be apparent to one skilled in the art that there are a variety of materials out of which the first pouch and the second pouch can be made. Although pipeline weight 10 is described as being filled with sand and/or gravel, it will be apparent to one skilled in the art that there are a variety of materials which can be used as weight enhancing filler material. Sand or gravel is preferred only because of its availability and low cost. Some pipelines are now being constructed using plastic or fibreglass pipe. These non-metallic pipes are more flexible and, consequently do not need the same amount of weight. The amount of weight used for metallic pipe cannot be used for non-metallic pipe, as it does not have the same load bearing capacity. In addition to the advantages described above, pipeline weight 10 is more readily adjusted to meet the requirements of various types of non-metallic pipe. This is accomplished simply by varying the amount of filler materials in first pouch 12 and second pouch 14. First pouch 12 and second pouch 14 do not always have to be filled to capacity. Any amount necessary to suit the requirements of an intended application may be used, as long as the weight is relatively equally distributed between first pouch 12 and second pouch 14 so as not to create a weight imbalance. In contrast, a concrete weight always has a fixed weight, the weight of the concrete weight cannot be adjusted but must be custom made to suit the requirements of an intended application. It will finally be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A pipeline weight, comprising:
   a first flexible pouch;
   a second flexible pouch;
   a connecting web extending between the first pouch and the second pouch, the connecting web having openings;
   each of the first pouch and the second pouch being filled with a weight enhancing filler material; and
   attachment straps threaded through the openings.

2. The pipeline weight as defined in claim 1, wherein the first pouch and the second pouch are made from fabric.

3. The pipeline weight as defined in claim 2, wherein the fabric is a non-woven polypropylene.

4. The pipeline weight as defined in claim 1, wherein the first pouch and the second pouch are water permeable.

5. The pipeline weight as defined in claim 1, wherein the weight enhancing filler material is rock fragments.

6. The pipeline weight as defined in claim 5, wherein the rock fragments are sand.

7. A pipeline weight, comprising:
   a first flexible water permeable fabric pouch;
   a second flexible water permeable fabric pouch;
   a connecting web extending between the first pouch and the second pouch, the connecting web having openings;
   each of the first pouch and the second pouch being filled with a weight enhancing filler material of rock fragments; and
   attachment straps threaded through the openings.

8. The pipeline weight as defined in claim 7, wherein the fabric is a non-woven polypropylene.

9. The pipeline weight as defined in claim 7, wherein the rock fragments are sand.

10. A pipeline weight, comprising:
    a first flexible water permeable non-woven polypropylene filter fabric pouch;
    a second flexible water permeable non-woven polypropylene filter fabric pouch;
    a connecting web extending between the first pouch and the second pouch, the connecting web having openings;
    each of the first pouch and the second pouch being filled with a weight enhancing filler material of sand; and
    attachment straps threaded through the openings.

* * * * *